(12) United States Patent
Yamada et al.

(10) Patent No.: US 6,264,866 B1
(45) Date of Patent: *Jul. 24, 2001

(54) METHOD FOR PRODUCING POLYIMIDE FILM

(75) Inventors: Hirofumi Yamada; Manabu Fukudome; Naoki Egawa, all of Otsu; Yuzuru Kondo, Ashiya; Haruhiko Maki, Kyoto, all of (JP)

(73) Assignee: Kanegafuchi Kagaku Kogyo Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,129

(22) Filed: Jun. 10, 1998

(30) Foreign Application Priority Data

Jun. 11, 1997 (JP) .................................. 9-153587

(51) Int. Cl.⁷ .............................. B29C 39/14; B29C 41/24
(52) U.S. Cl. ........................ 264/216; 264/204; 264/236; 264/331.19; 264/347
(58) Field of Search ................................... 264/216, 204, 264/236, 331.21, 347, 331.19

(56) References Cited

U.S. PATENT DOCUMENTS

| | | | | |
|---|---|---|---|---|
| 4,470,944 | * | 9/1984 | Asakura ........................ | 264/216 |
| 4,797,307 | * | 1/1989 | Kunimoto et al. ............. | 264/216 |
| 5,324,475 | * | 6/1994 | Okahashi et al. .............. | 264/216 |

* cited by examiner

*Primary Examiner*—Mathieu D. Vargot
(74) *Attorney, Agent, or Firm*—Pillsbury Winthrop LLP

(57) ABSTRACT

A method for producing a polyimide film in which the imidation ratio and/or the amount of volatile constituent are controlled to improve the adhesive strength of the polyimide film. The method may also comprise controlling the highest temperature of heating the prefilm to improve the adhesive strength of the polyimide film.

14 Claims, 3 Drawing Sheets

METHOD FOR PRODUCING POLYIMIDE FILM

BACKGROUND OF THE INVENTION

1. Field of Invention

The present invention relates to a method for producing a polyimide film, more particularly, to a method for producing a polyimide film by means of controlling its adhesive property.

2. Disclosure of the Related Art

As is commonly known, a polyimide film has various excellent properties such as heat-resistance, cold resistance, chemical-resistance, insulation and mechanical strength. Therefore, a polyimide film is widely used as such materials as an electric insulating film, a heat insulating film and a base film of flexible printed wiring board. In order to use a polyimide film for various purposes, a copper-clad laminated board is produced by superposing a layer of adhesive agent and copper foil on one or a both sides of a polyimide film, a pre-impregnated film (prepreg) is produced by coating a polyimide film with adhesive agent, or a composite film is produced by laminating fluorocarbon resin on a polyimide film. The adhesive strength is one of the important properties of a film, so that various attempts to improve the adhesive strength of a film have been made.

In order to provide the adhesive strength to a surface of a polymeric film, there are various techniques such as flame treatment for a film surface, corona discharge treatment, ultraviolet treatment, alkaline treatment, primer treatment, sand blast treatment and plasma treatment. For the purpose of providing the adhesive strength to a polyimide film without spoiling its other properties, one or more of the above-mentioned treatments are selected. These treatments are considered to be used for removing a weak boundary layer, which is formed on the film surface in the course of solvent-cast process and lowers the adhesive strength of a film.

All of the above-mentioned treatments are executed after producing a film to improve the adhesive strength of a finished film. The adhesive strength of a finished film is not constant. The above-mentioned after-treatments are also unstable. Therefore, it is difficult to stably provide a film with an improved adhesive strength by a prior art method. There is also an inevitable problem that the cost goes up due to the additional step to improve an adhesive property of a finished film. Same troubles and problems also occur in the course of producing a composite of a polyimide film and fluorocarbon resin. Thus, it has been difficult to constantly provide high adhesive strength to a film by using the conventional methods.

OBJECTS AND SUMMARY OF THE INVENTION

As the result of our researches to remove the above disadvantages and to stably provide a film with a high adhesive strength, we have eventually found the method for producing a film having an excellent adhesive property in which an adhesive property is controlled in course of producing a film. In the conventional method, an adhesive property of a film is improved by way of treating the surface of a finished film, however, in the present invention, an excellent adhesive property is incorporated in course of producing a film.

The method for producing a polyimide film according to the present invention, which overcomes the above-discussed and numerous other disadvantages and deficiencies of the prior art, comprising the steps of i) casting a composition into a film shape, wherein said composition consists substantially of organic solvent solution of polyamide acid; ii) heating the film-shaped composition to obtain a prefilm with an adjusted imidation ratio and/or an adjusted amount of volatile constituent; and iii) further heating said prefilm to obtain a polyimide film.

The adjusted imidation ratio of the prefilm can be 70% or more.

The adjusted amount of volatile constituent of the prefilm can be 40 weight % or less.

The adjusted imidation ratio of the prefilm can be 70% or more and the adjusted amount of volatile constituent of the prefilm can be 40 weight % or less.

The highest temperature of heating a prefilm can be in a range from 450° C. to 630° C.

Thus, the present invention disclosed herein makes possible the objectives of (1) providing an adhesive property directly to a polyimide film; (2) providing an adhesive property extremely stably to a polyimide film for the purpose of overcoming uneven quality of adhesiveness and sudden loss of adhesiveness, which are often the case with conventional methods for providing adhesiveness to a finished film; and (3) maintaining a high value of the adhesive strength of a composite film obtained by laminating fluorocarbon resin on a polyimide film.

DESCRIPTION OF THE PREFERRED EMBODIMENTS

Figure 1:
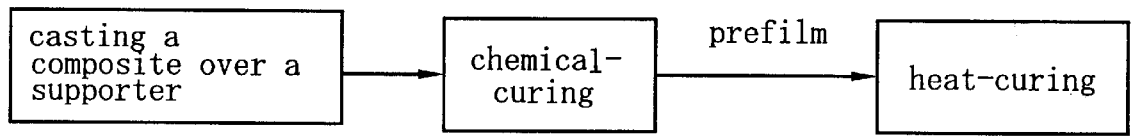
FIG. 1 is a flowchart of the present method for producing a polyimide film with an excellent adhesive property.

A "prefilm" used herein means a gel-state film hardened to such an extent that it can support itself after allowing a composition including the solvent solution of precursor of polyimide to flow from a die and then placing it on a supporter consecutively (in other words, casting the composition over the supporter); and evaporating a solvent or a reaction product to promote the imidation. The above-mentioned composition including the solvent solution of precursor of polyimide consists substantially of organic solvent solution of polyamide acid.

The preferred embodiments of the present method for producing a film with an excellent adhesive property are described below.

Generally, a polyimide film is insoluble and infusible, so that a solvent casting method, in which organic solvent solution of precursor of polyimide is cast over a supporter such as a drum and a belt, is used for producing a polyimide film. The solvent casting method is also used in the present invention.

A polyimide film produced by using the present method can be obtained from well-known materials, e.g., from one or more organic tetracarboxylic dianhydrides and one or more diamines.

In the present invention, the term "a polyimide film" is interpreted in a broad sense, including polyimide, polyamideimide, polyetherimide and polyesterimide films. The term includes polyimide films of non-thermoplasticity, thermoplasticity and thermosetting. In other words, molecular structure of polyimide is not restricted in the present invention. However, it is preferable that a polyimide consists of a repeating unit of the general formula (1):

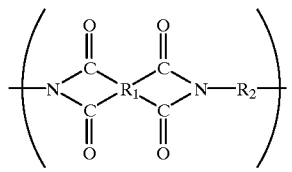

(1)

wherein $R_1$ is a tetravalent organic group. Concretely, $R_1$ has at least one benzene, which bonds directly to an adjoining carbonyl group. More concretely, $R_1$ is at least one selected from the group consisting of

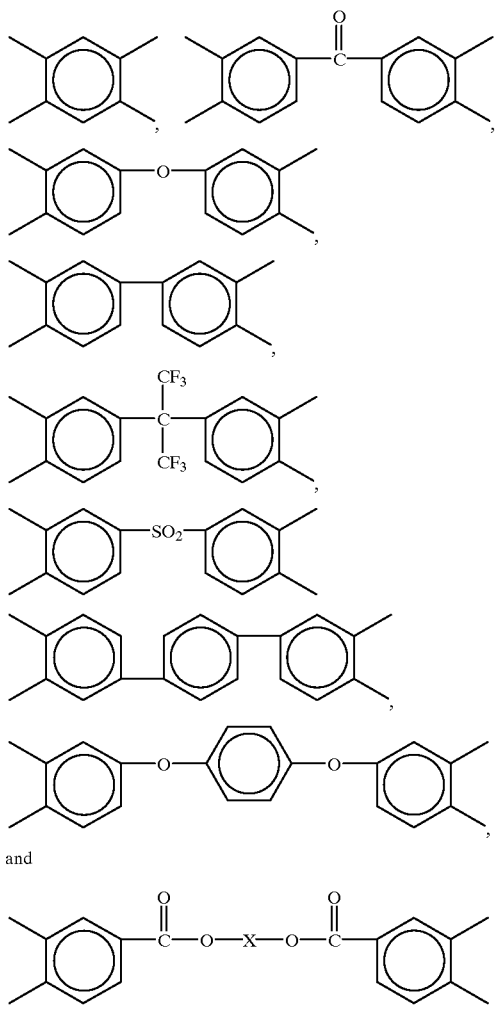

and

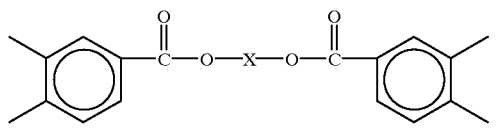

wherein X is a divalent functional group selected from the group consisting of

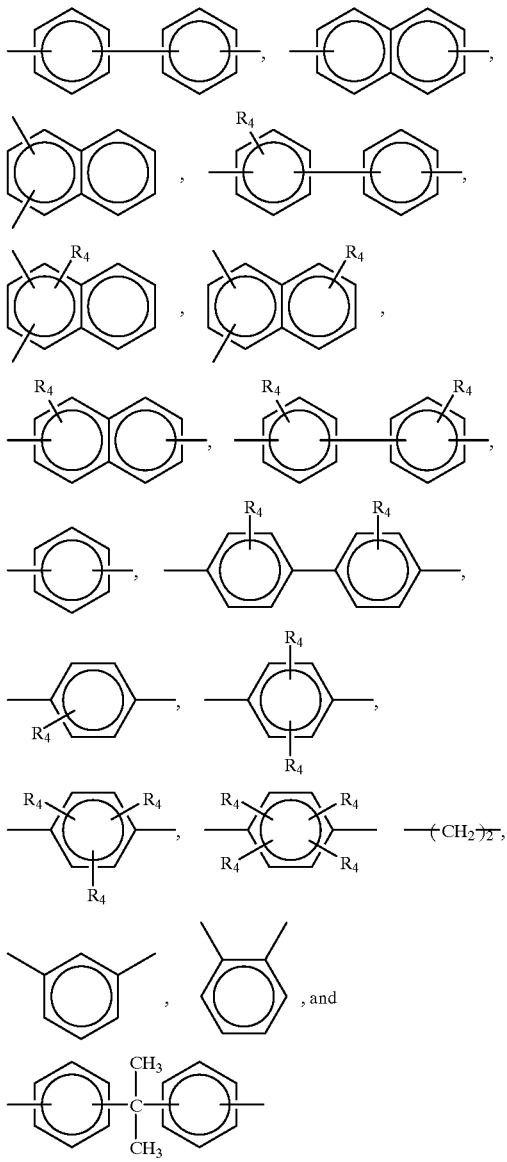

and $R_4$ is $CH_3$—, Cl—, Br—, F—, or $CH_3O$— and $R_4$ can be the same or the different in the case that more than two of them are substituted.

$R_2$ is a divalent organic group, which has at least one benzene. More concretely, $R_2$ is at least one selected from group consisting of

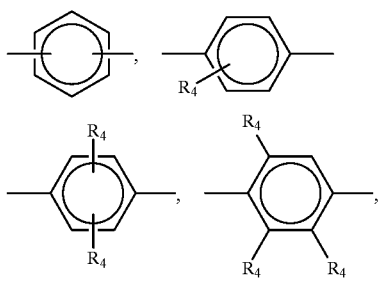

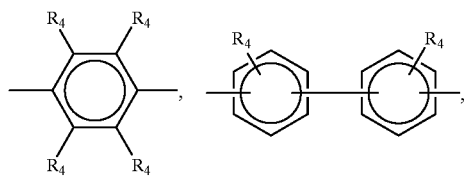,
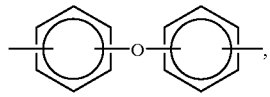,
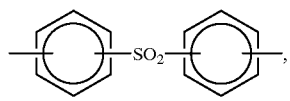,
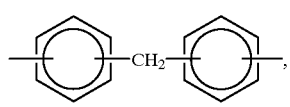,
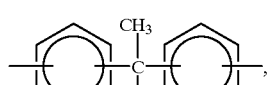,
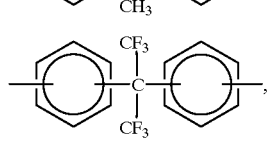,
,
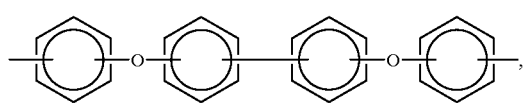,
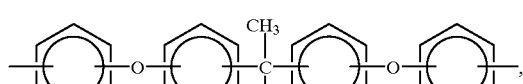,
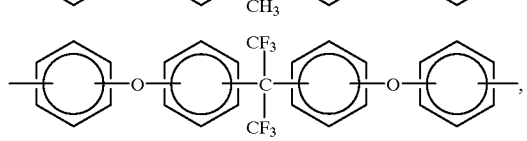,
,
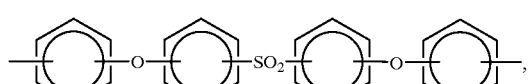,
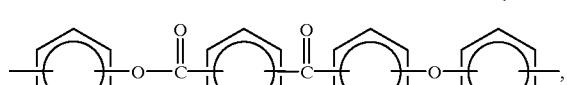,

and

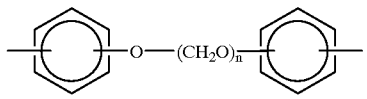

n = 1,2,3 wherein $R_4$ is $CH_3$—, Cl—, Br—, F—, or $CH_3O$— and $R_4$ can be the same or different kind in the case that more than two of them are substituted.

One of the preferred polyimides contains $R_1$ represented by

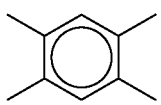

and $R_2$ represented by

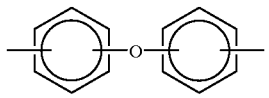

as the main component respectively. A polyimide copolymer containing $R_1$ represented by

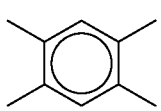

and $R_2$ represented by

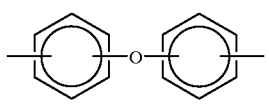

and

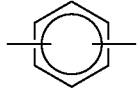

as the main component respectively is also preferred.

Moreover, it is preferable that the molar ratio of organic group represented by

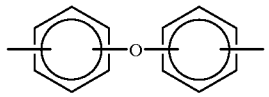

to organic group represented by

is raging from 50 to 50 to 90 to 10.

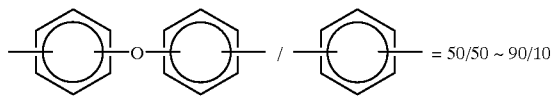

It is also preferable that a polyimide copolymer contains $R_1$ represented by

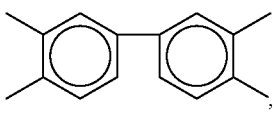

and $R_2$ represented by

or $R_1$ represented by

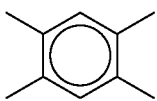

and

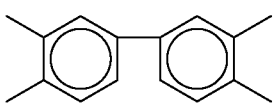

and $R_2$ represented by

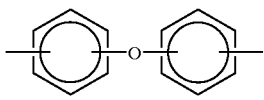

and

as the main component respectively.

Polyimide resin represented by the above general formula (1) can be obtained by the dehydrating closure reaction of a polyamide acid polymer, which is a precursor of polyimide resin. Polyamide acid solution may be obtained by polymerizing an approximately equal mole of dianhydride and diamine in organic polar solvents according to the conventional method.

One example of the methods for producing polyamide acid is described below. Under an inert atmosphere consisting of, e.g., argon gas, nitrogen gas or the like, at least one kind of acid dianhydrides selected from aromatic tetracarboxylic dianhydrides represented by the general formula (2);

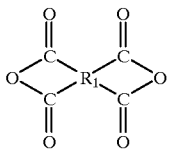

wherein $R_1$ is a tetravalent organic group, is dissolved or diffused in organic solvents to make a solution. At least one kind of diamine ingredients represented by the general formula (3), wherein $R_2$ is a bivalent organic group is added to the solution to obtain a polyamide acid polymer. The diamine ingredients can be dissolved or diffused in an organic solvent prior to adding the solution. Alternatively, the diamine in a solid state may be added to the solution. It is preferable that the reacting temperature ranges from $-10°$ C. to $50°$ C. and the reacting time ranges from 30 minutes to 6 hours.

Alternatively, first, one or more diamines may be dissolved or diffused in an organic solvent to make a solution. Then one or more acetic dianhydrides are added to the solution to obtain a polyimide acid solution. Also, diamines and acetic dianhydrides can be mixed in an organic solution simultaneously.

It is preferable that the average molecular weight of polyimide resin is more than 10,000 in order to maintain the strength of polyimide resin. In many cases, it is difficult to directly measure molecular weight of a polyimide polymer. In such cases, molecular weight is estimated indirectly. For example, in the case that a polyimide polymer is synthesized by polyamide acid, molecular weight of polyimide is considered to be equivalent to that of polyamide acid.

As aromatic tetracarboxylic dianhydride represented by the general formula (2),

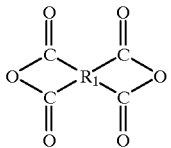

various types of aromatic tetracarboxylic dianhydride can be used. More concretely, in due consideration of balance of various properties, one or more aromatic tetracarboxylic dianhydrides can be selected, wherein $R_1$ of the general formula (2) is a tetravalent organic group selected from the group consisting of

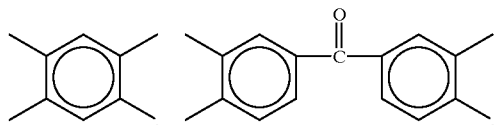

-continued

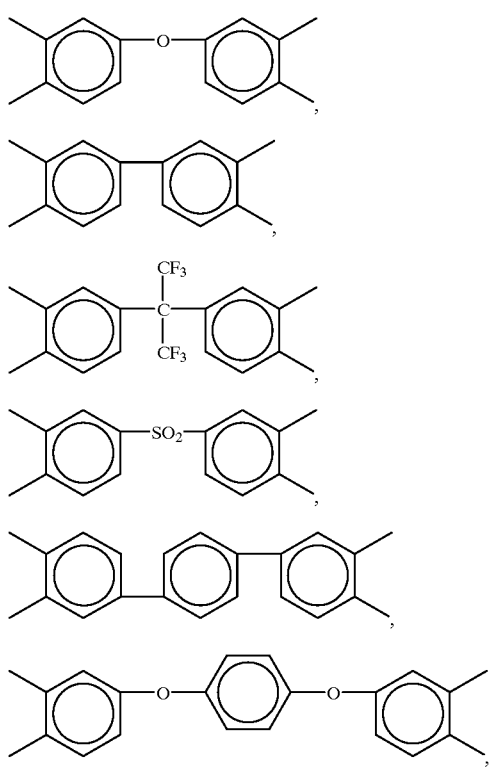

and

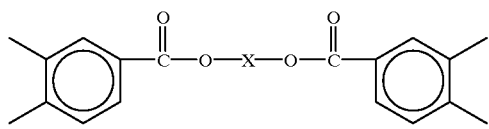

Wherein X is a bivalent functional group represented by

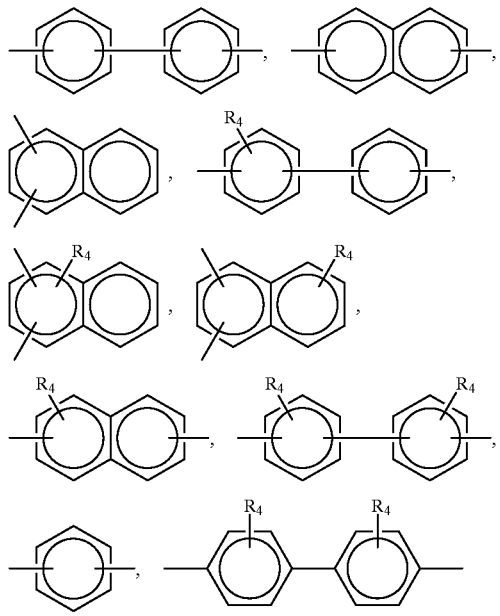

-continued

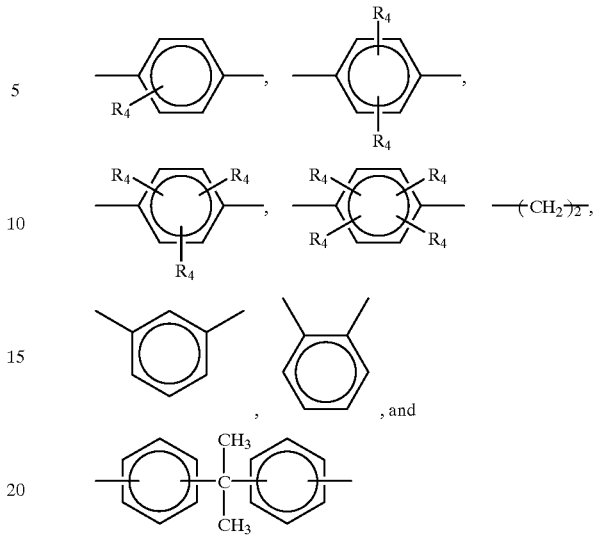

$R_4$ is $CH_3$—, Cl—, Br—, F—, or $CH_3O$— and $R_4$ can be the same or different kind in the case that two or more of them are substituted.

Various types of diamines can be used as a diamine compound represented by the general formula (3).

$$H_2N—R_2—NH_2 \qquad (3)$$

More concretely, in due consideration of balance of various properties, one or more diamines can be selected, wherein $R_2$ of the general formula (3) is a bivalent organic group selected from the group consisting of

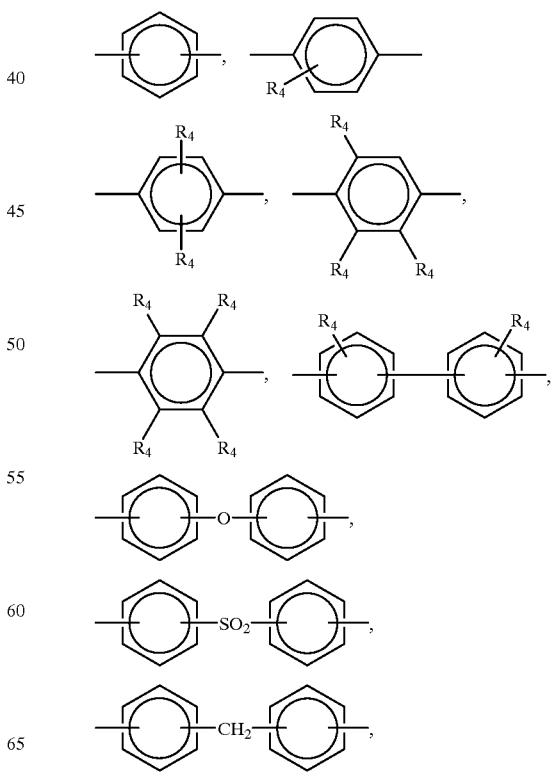

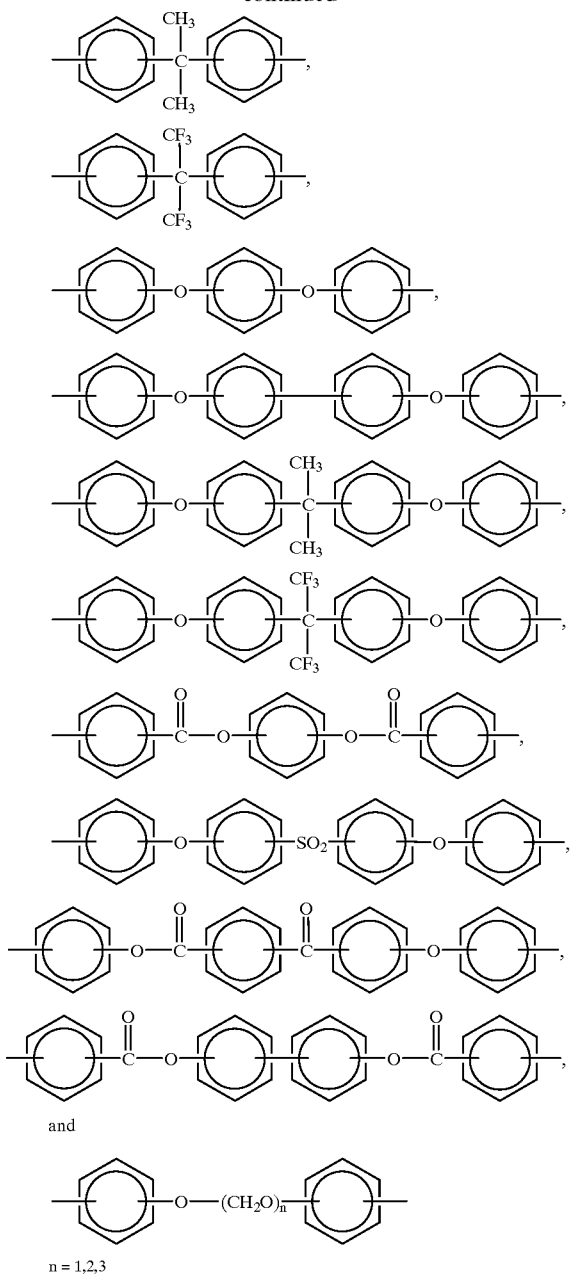

n = 1,2,3 wherein $R_4$ is $CH_3$—, Cl—, Br—, F—, or $CH_3O$— and $R_4$ can be the same or different kind in the case that two or more of them are substituted. The examples of organic solvents, which can be used in producing polyamide acid, are as follows: sulfoxide solvents such as dimethylsulfoxide and diethylsulfoxide; formamide solvents such as N,N-dimethylformamide and N,N-diethylformamide; and acetamide solvents such as N,N-dimethylacetamide and N,N-diethylacetamide. One of the above-mentioned organic solvents can be used alone or the combination of two or more of them can be used as mixed organic solvents. Also, the combination of the above polar solvents and inactive solvents of polyamide acid can be used as mixed organic solvents. Examples of such inactive solvents are acetone, methanol, ethanol, isopropanol, benzene, 2-methoxyethanol toluene, xylene, THF and the like.

Polyimide can be produced from polyamide acid obtained by means of the above-mentioned reaction. Polyimide can be obtained by a chemical-curing method, in which polyamide acid, a precursor of polyimide, is imidated by being heat-treated under the presence of both dehydrating agent represented by acid anhydride including acetic anhydride and tertiary amine including picoline, quinoline, isoquinoline and pyridine. Alternatively, polyimide can be also obtained by means of the heat-curing method, in which imidating reaction proceeds without dehydrating agent and tertiary amine. Since imidating reaction takes place more rapidly in the chemical-curing method, the chemical-curing method can be more productive and profitable than the heat-curing method. Moreover, polyimide obtained from the chemical-curing method has advantages of high mechanical strength and small coefficient of linear expansion.

The use of the chemical-curing method followed by the heat-treating treating method makes possible speedier imidation. Therefore, it is preferable to produce polyimide film by the combined use of the chemical-curing method and the heat-curing method. In the present invention, said combined use is introduced to the process of imidation.

As shown in FIG. 1, the chemical-curing method is used in the first half of the process and the heat-curing method in the latter half of the process, in which imidation completes. Therefore, "a prefilm" of the present invention is defined as a film obtained after the chemical-curing process but before the heat-curing process.

Next, one example of methods for producing a polyimide film according to the present invention is concretely described below. Typically, the methods for producing a polyimide film by imidating a precursor of polyimide may consist of two processes. The one may be the chemical-curing process executed in the drum or the belt chamber or the equivalent thereof, and the other may be the heat-curing process executed in the tenter chamber or the equivalent thereof.

In the process executed in the belt chamber, a precursor of polyimide mixed by the blender is allowed to flow from the T-die. The precursor of polyimide allowed to flow from the T-die is placed onto the endless belt or on the casting drum to be formed into the shape of film while being hardened. The film-shaped precursor is moved and heated in accordance with the rotation of the belt or the drum while imidation of the film is promoted. In the belt chamber, reaction products which are combustible volatile constituents consisting mainly of acetic acid and organic solvents are transpired.

In the belt chamber, the temperature of atmosphere and rotation speed of the belt or the drum are adjusted for the purpose of prevention of ignition to the combustible volatile constituent transpired from the polyimide resin or to the resin itself. A warm breeze, hot blast, radiant heat, belt heat and the like can be used in the belt chamber.

In the course of the above process, imidation of a film-shaped composition is promoted. After being heated and dried to such an extent that it can support itself, the film-shaped composition is exfoliated from the endless belt to obtain a prefilm.

The inventors of the present invention found out that the amount of volatile constituent and the imidation ratio have a remarkable effect directly on the improvement of an adhesive property of the fished film. Finally, we succeeded in stably providing a film with an excellent adhesive property at a reasonable price by controlling the amount of volatile constituent and the imidation rate of a prefilm within a certain range.

In the case of successive processes, a film-shaped composition is treated in the tenter chamber by using the heat-curing method after being exfoliated from the drum or the belt. This film-shaped composition exfoliated from the drum or the belt can be defined as a prefilm. However, the embodiment of the present invention is by no means limited to the above and various embodiments are applicable. Depending on the situation, an additional heating apparatus including the heat roll can be also applied to the embodiment in order to promote chemical-curing of a film.

In other words, a prefilm can be defined as a film obtained before being put in the tenter chamber or the equivalent thereof in which heat-curing is completed.

In the present invention, the amount of volatile constituent of a prefilm is calculated by using the following formula;

$$\text{volatile constituent}(\%) = \frac{(W - W_0)}{W_0} \times 100$$

W: the weight of a prefilm before being dried
$W_0$: the weight of a prefilm after being heat-treated at 450° C. for 20 minutes It is preferable that the amount of volatile constituent of a prefilm exfoliated from a supporter such as the endless belt and the drum should be adjusted to a range of 20–200 weight %. When the amount of volatile constituent of a prefilm is less than 40 weight %, the adhesive strength of a finished polyimide film is improved.

The imidation rate of a prefilm is calculated on the basis of absorbance of a sample prefilm measured by using the method of infrared absorption spectrum. To prepare a sample, a film of about 50 mm in length and about 100 mm in width is cut out of a prefilm and then soaked in methanol solution with 5 weight % of aniline for about an hour. The solution is then changed into methanol and the film is soaked in methanol for about half an hour for three times. Then the film is washed and dried at a room temperature. The absorbance of the sample prepared as such is measured by using the device for Fourier transform infrared absorption spectrum (System 2000, available from Perkin Elmer Co. Ltd.) under the condition of ATM prism KRS-5, a prism entrance angle of 45°, measuring range of 4000 $cm^{-1}$~4500 $cm^{-1}$, ten times of measuring and resolution of 4.00. The imidation rate of the sample is calculated by using the following formula;

$$\text{Imidation ratio}(\%) = \frac{n_x}{n_{100}} \times 100$$

n: absorbance of a sample at 1374 $cm^{-1}$/absorbance of a sample at 1498 $cm^{-1}$
$n_x$: n value of a measured film
$n_{100}$: n value of completely (100%) imidated film Absorbance at 1374 $cm^{-1}$ is characteristic of an imido group and absorbance at 1498 $cm^{-1}$ is characteristic of benzene ring. A 100%-imidized film is obtained by forming a composition consisting of a polymer and organic solvent solution identical to the sample into a film shape and then heating the film-shaped composition at 110° C. for 120 seconds, 300° C. for 30 seconds, 450° C. for 70 seconds, 500° C. for 30 seconds and then 500° C. for 5 minutes.

Preferably, the imidation ratio of a prefilm exfoliated from the heated supporter such as the endless belt and the drum is adjusted to 70% or more. An adhesive property of a finished polyimide film is improved by adjusting the imidation ratio in a range of 70% or more. The films made of a prefilm of 70% or more imidation ratio have much higher adhesive strength than that made of prefilm of less than 70% imidation ratio.

The amount of volatile constituent and the imidation ratio can be adjusted by controlling the temperature and the heating time in the belt chamber. Normally, in the chemical-curing process, heating is executed to promote a reaction. However, in order to exclusively promote chemical-curing rather than heat-curing the temperature is maintained 200° C. or less. It is preferable to gradually raise the temperature of the atmosphere in the belt chamber step by step, so that solvent and reaction product are evaporated. A sudden rise of the temperature causes wrinkles on the film surface due to the difference of the drying speed between the surface and the inside of the film. Also, it causes undesired exfoliation due to partial hardening of the edge.

The temperature in the belt chamber is adjusted depending on the kind and the thickness of a film and the kind of a solvent to be used. The temperature is gradually increased to nearly a boiling point of a solvent. For example, in the case that dimethylformamide is used as a solvent, as a boiling point of dimethylformamide is 153° C., the temperature in the belt chamber is adjusted to 50° C. to 150° C. The highest temperature in the belt chamber has a potent influence on an adhesive property of a finished film. Higher maximum temperature produces a higher adhesive property of a finished film.

Heating time also depends on the thickness of a film, the kind of a film-shaped composition and the highest temperature in the belt chamber. Higher maximum temperature can reduce heating time and production cost.

Figure 2:
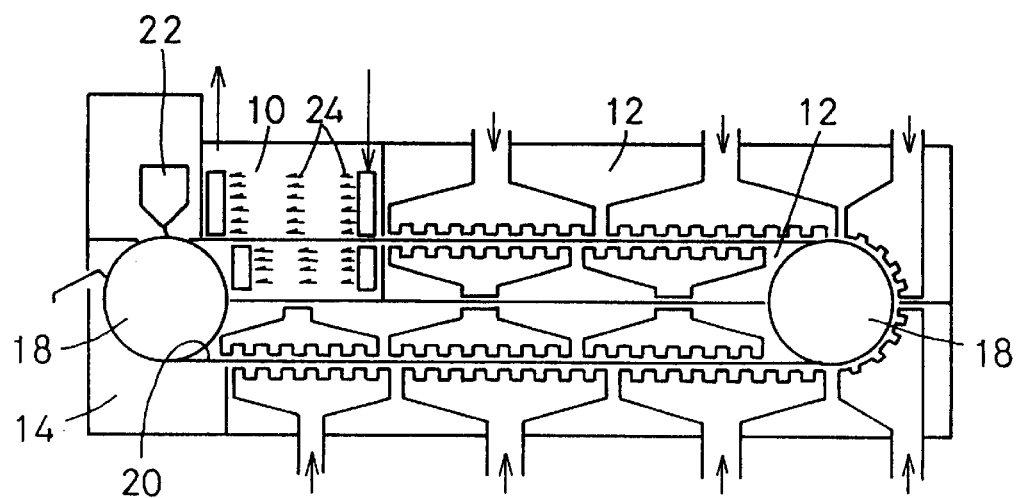
FIG. 2 is an example of the belt chamber according to the present invention.

Next, the belt chamber is concretely described below. The preferable belt chamber is separated into several rooms to differentiate the temperatures between the rooms. In the process shown in FIG. 2, the belt chamber consists of: a parallel stream solidifying room 10, jet stream solidifying rooms 12, an exfoliation room 14. In the room 10, a film cast over the supporter is heated up and then exposed to a gas stream parallel to a film to be solidified to such an extent that the film loses its fluidity. The room 12 consists of one or more sections, in which the film treated in the room 10 is exposed to gas blowing against it to be solidified to such an extent that it can support itself. In the room 14, the film treated in the room 12 is exfoliated from the endless belt 20.

More specifically, a film-shaped composition of polyimide precursor solvent solution from the die 22 is conveyed to the endless belt 20 which may be made from stainless-steel, aluminum-alloy or the like. The pulleys 18 over which the belt 20 is trained contain cooling devices. Then, gas 24 is sent parallel to the surface of the film-shaped composition heated up evenly. The film-shaped composition is gradually solidified by gas 24 to such an extent that a film loses its fluidity in the room 10, while volatile constituent and organic solvents produced in this process are being transpired. The so obtained film-shaped composition is then conveyed to the rooms 12, in which the film-shaped composition is heated by one or several stages, while the jets of gas is blown against the film-shaped composition from nozzles resulting in transpiring volatile constituent and organic solvents. The so treated film-shaped composition, or a prefilm, which is solidified and dried to such an extent that it can support itself is exfoliated from the endless belt 20 in the room 14. This prefilm is heat-treated in the tenter chamber in the next step.

The amount of volatile constituent of the prefilm before heat-treating in the tenter chamber is preferably 40 weight % or less, and more preferably 30 weight % or less in order to improve an adhesive property of a finished film.

Moreover, in the present invention, the imidation ratio of a prefilm is preferably 70% or more, and more preferably 80% or more in order to improve an adhesive property of a finished film.

An adhesive property of a finished polyimide film can be improved by controlling the amount of volatile constituent and the imidation ratio of a prefilm as mentioned above. The amount of volatile constituent and the adhesive strength are correlated, and so are imidation ratio and the adhesive strength. It is presumed that volatile constituent which hinders the adhesive strength of a finished film can be effectively removed by holding down the amount of volatile constituent of a prefilm.

In the next process, the prefilm exfoliated from the endless belt is heat-treated in the tenter chamber with its edges fixed. The tenter chamber can consist of a heating furnace and a device for lowering the temperature gradually. However, it is by no means limited to the above. In the tenter chamber, the film can be moved by shifting a sheet fixed by pins in accordance with rotating drive of a pin conveyer. Imidation of a prefilm is promoted by gradual heat-treatment of the prefilm in the heating furnace, in which heat-curing is executed. Normally, heat-treatment is carried out at the starting temperature of about 200° C. and then the temperature is gradually raised so as to complete imidation of a prefilm. Thus, a finished polyimide film is obtained.

The highest temperature of the heat-treatment is preferably in a range from 450° C. or more to 630° C. or less, and more preferably from 520° C. or more to 580° C. or less. A temperature gradient to the highest temperature can be any form without any special restriction. In the case that the highest temperature is less than 450° C., the adhesive strength of a finished film is not effectively improved. In the case that the highest temperature is more than 630° C., mechanical properties including the adhesive strength is extremely spoiled, which is considered to be caused by heat deterioration of a polyimide film.

As shown in the above embodiment, a prefilm exfoliated from the endless belt can be heat-treated at the highest temperature of 450° C. or more to 630° C. or less successively as the final stage of the whole process. Alternatively, a finished polyimide film produced by the use of the conventional methods can be heat-treated at the temperature of 450° C. or more to 630° C. However, in order to simplify the process and to avoid high production cost, the above heat-treatment is preferred to be carried out in course of producing polyimide.

The heat-treatment can be carried out for few seconds to few minutes, preferably for ten seconds to ten minutes, and more preferably for ten seconds to three minutes, which depends on the heating temperature. For example, heat-treating a polyimide film at 600° C. for ten minutes causes heat deterioration. For another example, heat-treating a polyimide at 500° C. for five seconds does not produce sufficient results on the improvement of an adhesive property.

A polyimide film, which is completely imidized in the above heat-curing process, gradually cooled down in the device for lowering the temperature.

As described above, the method for heat-treating a film at a very high temperature ranging from 450° C. or more to 630° C. or less has never been proposed as a method for improving an adhesive property of a polyimide film in the prior arts. Therefore, the present invention is a novel invention to improve an adhesive property of a finished polyimide film by quite simple heat-treatment. The mechanism is not completely cleared up at the moment, however, an adhesive property is supposed to be improved with the result that a dense layer is formed on the surface of the film by heat-treating at the high temperature.

A polyimide film obtained by using the method of the present invention includes a sheet-like film with a various thickness ranging from a few micrometers to hundreds of micrometers. The thickness of a film can be selected in accordance with the purpose of use. For example, a film with the thickness of 12.5 $\mu$m to 50 $\mu$m is used as a base film of a flexible printed wiring board.

The present invention is a method to improve an adhesive property of a finished film by controlling the imidation ratio and the amount of volatile constituent of a prefilm. Moreover, the present invention makes possible to stably and economically provide a film with a higher adhesive property by heat-treating at the high temperature in the tenter chamber.

The present method for producing a polyimide film is described above as an example of the embodiments of the method. However, this invention is by no means limited thereto. As the need arises, other well-known after-treatment such as flame treatment, corona discharge treatment, ultraviolet treatment, alkaline treatment, primer treatment, sandblast treatment and plasma treatment can be combined with the method of the present invention.

EXAMPLES

The present invention will be more clearly understood by referring to the Examples below. However, the Examples should not be construed to limit the invention in any way. In the Examples, corona discharge treatments were executed against polyimide films at 220±10 W·min/m$^2$ of electric power density with the use of aluminum electrode. The adhesive strength of the polyimide film was evaluated by executing the following measuring method: using acrylic adhesive agent "Pyralux" (a product and trade name of E. I. du Pont de Nemours & Co., Inc.), the polyimide film was laminated with a copper foil having 35 $\mu$m of thickness "3EC" (an electrolyzed copper foil, a product of Mitui Metal & Mining Co., Ltd.), and then the above adhesive agent was allowed to react at 185° C. for an hour to be hardened to produce FCCL (flexible copper-clad laminate); a test sample was cut out of the FCCL so that width of copper pattern of the FCCL could become 3 mm, and then the sample was subject to a tension test via 90° of exfoliation at 50 mm/min. of peeling speed by applying a tension tester "S-100-C", a product of Shimazu Seisakusho, Co., Ltd. The results of the average of five measurements are shown in Table 1.

Examples 1~12

The imidation rate and the amount of volatile constituent of a prefilm, and the adhesive strength of a finished product were measured. The heating temperature and time at the stage of chemical curing varied while conditions at the stage of heat-curing were constant.

Polyamide acid solution was prepared from 4,4'-diaminodiphenylether selected from aromatic diamines and pyromellitic acid dianhydride selected from aromatic tetracarboxylic dianhydrides. Acetic anhydride and isoquinoline were mixed quickly with the solution. The molar rate of the acetic anhydride to a repeating unit of the polyamide acid was 5.5 to 1, and the molar ratio of the isoquinoline to a repeating unit of the polyamide acid was 0.55 to 1. Then the mixture was formed into a film-shaped composition on the aluminum foil with the thickness of 30 $\mu$m. Each film-shaped composition was heated for 30 to 360 seconds at the temperature ranging from 90 to 160° C. in an oven under the 12 different conditions, and prefilms with the thickness of 25 μm were finally obtained. Then the prefilms were heat-treated at the temperature of 300° C. for 30 seconds and then at the temperature of 500° C. for a minute. Thus the imidation of the prefilms was completed and the finished films were subjected to corona discharge treatment to obtain PI film products.

The amount of volatile constituent and the imidation ratio concerning each prefilm as well as the adhesive strength of each corresponding P1 film product were measured. The results are shown in Table 1.

TABLE 1

|  | temperature (° C.) | time (sec.) | volatile constituent (%) | imidation ratio (%) | adhesive strength (kg/cm) |
| --- | --- | --- | --- | --- | --- |
| Example 1 | 90 | 90 | 216 | 78 | 0.79 |
| Example 2 | 90 | 180 | 37 | 80 | 1.34 |
| Example 3 | 90 | 360 | 28 | 80 | 1.36 |
| Example 4 | 110 | 60 | 256 | 66 | 0.79 |
| Example 5 | 110 | 90 | 61 | 85 | 1.22 |
| Example 6 | 110 | 120 | 31 | 87 | 1.40 |
| Example 7 | 110 | 180 | 25 | 88 | 1.43 |
| Example 8 | 110 | 240 | 22 | 88 | 1.51 |
| Example 9 | 160 | 30 | 202 | 80 | 0.99 |
| Example 10 | 160 | 60 | 25 | 85 | 1.54 |
| Example 11 | 160 | 90 | 17 | 91 | 1.63 |
| Example 12 | 160 | 120 | 15 | 94 | 1.70 |

Figure 3:
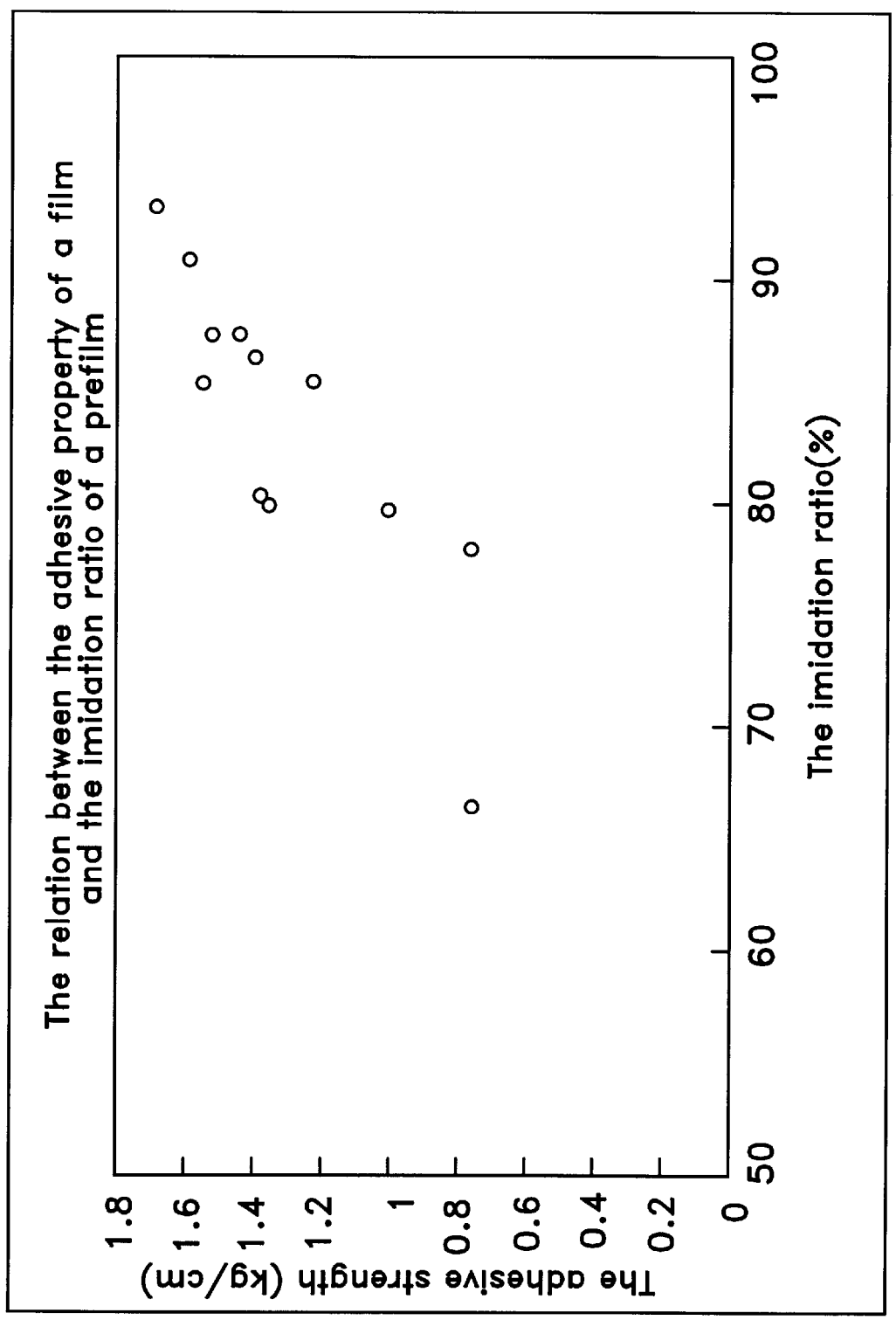
FIG. 3 is a graph showing the relation between the amount of volatile constituent of a prefilm and the adhesive strength of a finished product. (The imidation ratio is not fixed.)
Figure 4:
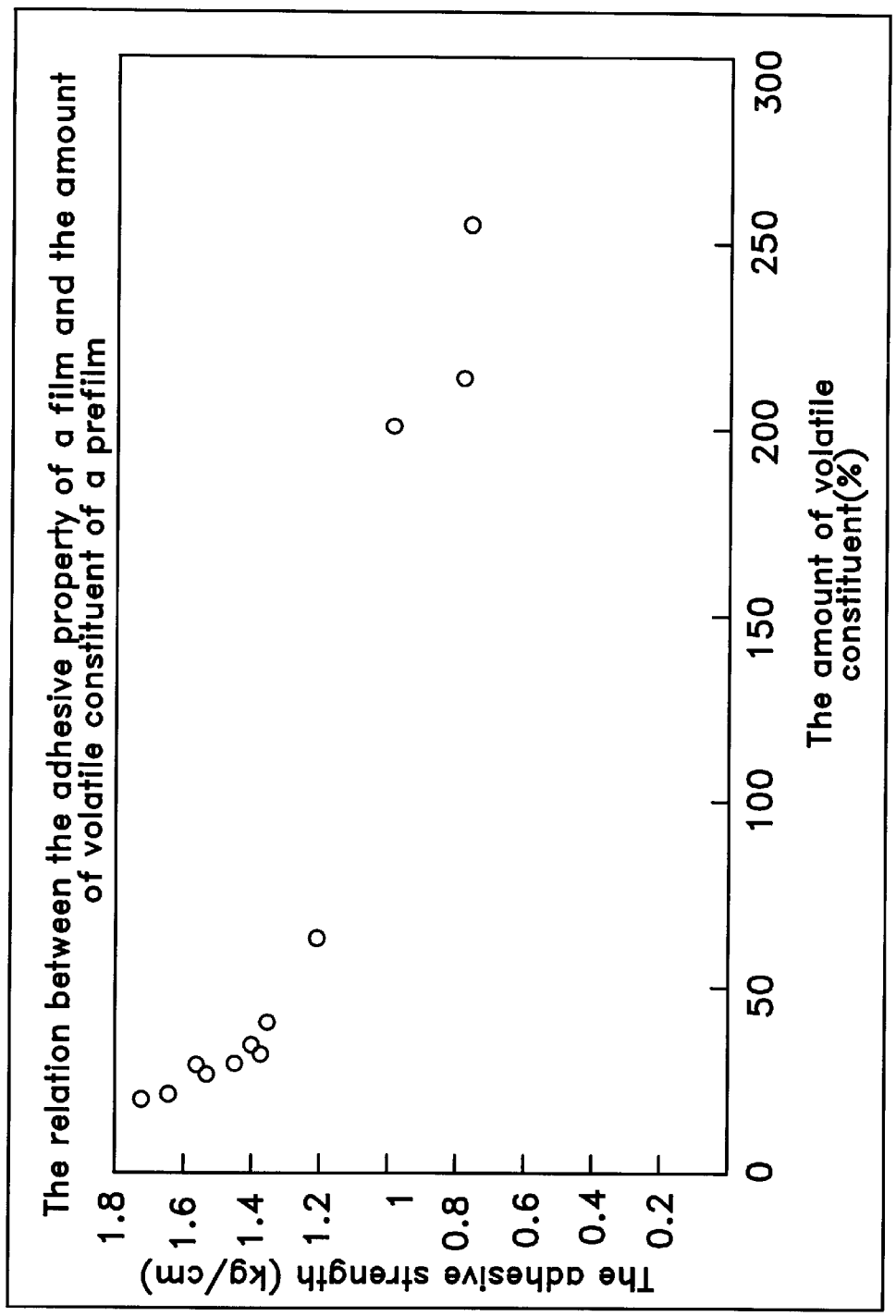
FIG. 4 is a graph showing the relation between the imidation ratio of a prefilm and the adhesive strength of a finished product. (The amount of volatile constituent is not fixed.)

Based on the results, the relation between the amount of volatile constituent of prefilms and the adhesive strength of the P1 film products as well as the relation between the imidation ratio of prefilms and the adhesive strength of the P1 film products are shown in FIGS. 3 and 4, respectively.

Table 1 shows that higher temperature in the belt chamber or longer heating time in the case of same temperature makes the amount of volatile constituent decreased and the imidation ratio increased. Table 1, FIG. 3 and FIG. 4 show that less amount of volatile constituent or higher imidation ratio of a prefilm makes the adhesive strength of the finished product increased.

Examples 13~15

Polyamide acid solution was obtained from 4,4'-diaminodiphenylether and para-phenylenediamine selected from aromatic diamines in the molar rate of 3:1 and pyromellitic acid dianhydride selected from aromatic tetracarboxylic dianhydrides. Acetic anhydride and isoquinoline were added to the solution. The molar rate of the acetic anhydride to a repeating unit of the polyamide acid was 5.0 to 1, and the molar rate of the isoquinoline to a repeating unit of the polyamide acid was 0.51 to 1. Then the mixture was stirred sufficiently and adjusted to 0° C. to make dope.

The so obtained dope was allowed to flow from a T-die and formed into a film-shaped composition with the thickness of about 250 μm on the smooth metal endless belt consecutively. Then it was dried up by hot air while the belt was rotated. The amount of volatile constituent of three prefilms, each of which was prepared under the conditions that the temperature of the belt chamber was set at 85° C./95° C./100° C., 95° C./105° C./110° C. and 110° C./120° C./125° C. (the total drying time is about 100 seconds), respectively, were measured.

The prefilms exfoliated from the belt were heat-treated at the temperature ranging from 250° C. to 550° C. for about 80 seconds in total in the tenter chamber. Then the films were gradually cooled down to room temperature in the cooling room. After that, corona discharge treatment was executed against each film and the adhesive strength of the 25 μm-thick polyimide film obtained under the above three temperature conditions was measured. The results of the measurement are shown in Table 2.

TABLE 2

|  | volatile constituent (%) | adhesive strength (kg/cm) |
| --- | --- | --- |
| Example 13 | 140 | 1.2 |
| Example 14 | 90 | 1.3 |
| Example 15 | 40 | 1.4 |

Table 2 shows that as the amount of volatile constituent of a prefilm decreases, the adhesive strength of a corresponding film increases.

Examples 16~18

Next, polyimide films were produced under the various conditions of maximum temperature in the heat-curing treatment process in a tenter chamber, while the condition of chemical curing remained constant.

Polyamide acid solution was prepared from 4,4'-diaminodiphenylether selected from aromatic diamines and pyromellitic acid dianhydride selected from aromatic tetracarboxylic dianhydrides. Acetic anhydride and isoquinoline were mixed quickly with the solution. The molar ratio of the acetic anhydride to a repeating unit of the polyamide acid was 5.5 to 1, and the molar ratio of the isoquinoline to a repeating unit of the polyamide acid was 0.55 to 1. Then the mixture was formed into a film-shaped composition. After that, the film-shaped composition was heat-treated at the temperature of 120° C. for 100 seconds to obtain a prefilm. Then the prefilm was treated at 270° C. for 30 seconds and at 370° C. for 30 seconds (the temperature was gradually raised). The resulting film was then baked for 30 seconds at the maximum temperature of 500° C., 550° C. and 630° C., respectively. Consequently, three kinds of 25 μm-thick polyimide film were produced under three different conditions.

Examples 19~21

Polyamide acid solution was obtained from 4,4'-diaminodiphenylether and para-phenylenediamine selected from aromatic diamines in the molar ratio of 3:1 and pyromellitic acid dianhydride selected from aromatic tetracarboxylic dianhydrides. Acetic anhydride and isoquinoline were mixed quickly with the solution. The molar ratio of the acetic anhydride to a repeating unit of the polyamide acid was 5.0 to 1, and the molar ratio of the isoquinoline to a repeating unit of the polyamide acid was 0.51 to 1. Then the mixture was formed into a film-shaped composition. After that, the film-shaped composition was heat-treated at the temperature of 120° C. for 100 seconds to obtain a prefilm. Then it was heat-treated at 270° C. for 30 seconds and at 370° C. for 30 seconds (the temperature was gradually raised). The resulting film was baked for 30 seconds at the maximum temperature of 500° C., 570° C. and 630° C., respectively. Consequently, three kinds of 25 μm-thick polyimide films were produced under three different conditions.

The adhesive strength of each 25 m-thick polyimide film obtained in Example 16 to 21 was evaluated. The results are shown in Table 3.

TABLE 3

| | maximum temperature (° C.) | time (sec.) | adhesive strength (kg/cm) |
|---|---|---|---|
| Example 16 | 500 | 30 | 0.6 |
| Example 17 | 550 | 30 | 0.7 |
| Example 18 | 630 | 30 | 0.7 |
| Example 19 | 500 | 30 | 0.6 |
| Example 20 | 570 | 30 | 0.8 |
| Example 21 | 630 | 30 | 0.8 |

Table 3 shows that the higher maximum temperature produces higher adhesive strength.

A polyimide films which were heat-treated at the various temperatures under the equal maximum condition of 450° C. were compared as follows.

Example 22

Polyamide acid solution was prepared from 4,4'-diaminodiphenylether selected from aromatic diamines and pyromellitic acid dianhydride selected from aromatic tetra-carboxylic dianhydrides. Acetic anhydride and isoquinoline were mixed quickly with the solution. The molar ratio of the acetic anhydride to a repeating unit of the polyamide acid was 5.5 to 1, and the molar ratio of the isoquinoline to a repeating unit of the polyamide acid was 0.55 to 1. Then the mixture was formed into a film-shaped composition. After that, the film-shaped composition was heat-treated at the temperature of 120° C. for 100 seconds to obtain a prefilm. Then it was heat-treated at 270° C. for 30 seconds and at 370° C. for 30 seconds (the temperature was gradually raised). The resulting film-shaped composition was then baked for a minute at the maximum temperature of 450° C. Consequently, 25 μm-thick polyimide film was produced.

Example 23

Polyamide acid solution was obtained from 4,4'-diaminodiphenylether and para-phenylenediamine selected from aromatic diamines in the molar ratio of 3:1 and pyromellitic acid dianhydride selected from aromatic tetra-carboxylic dianhydrides. Acetic anhydride and isoquinoline were mixed quickly with the solution. The molar ratio of the acetic anhydride to a repeating unit of the polyamide acid was 5.0 to 1, and the molar ratio of the isoquinoline to a repeating unit of the polyamide acid was 0.51 to 1. Then the mixture was formed into a film-shaped composition. After that, the film-shaped composition was heat-treated at the temperature of 120° C. for 100 seconds to obtain a prefilm. Then it was heat-treated at 270° C. for 30 seconds and at 370° C. for 30 seconds (the temperature was gradually raised). The resulting film-shaped composition was then baked for a minute at the maximum temperature of 450° C. Consequently, a 25 μm-thick polyimide film was produced.

The adhesive strength of a 25 μm-thick polyimide film obtained in Example 22 to 23 was measured. The results are shown in Table 4.

TABLE 4

| | maximum temperature (° C.) | time (min.) | adhesive strength (kg/cm) |
|---|---|---|---|
| Example 22 | 450 | 5 | 0.3 |
| Example 23 | 450 | 5 | 0.3 |

These results show that the adhesive strength of the film heat-treated at a low maximum temperature is lower than that of the film heat-treated at a high maximum temperature.

Examples 24~25

Polyimide films obtained in the Examples 22 and 23 were heat-treated at the temperature of 550° C. and 570° C. which were equal condition of the Examples 17 and 20, and then the adhesive strength of each film was measured. The results are shown in Table 5.

TABLE 5

| | additional treatment | adhesive strength (kg/cm) |
|---|---|---|
| Example 24 | Example 22 + 550° C. × 30 sec. | 0.7 |
| Example 25 | Example 23 + 570° C. × 30 sec. | 0.8 |

These results show that the adhesive strength of a polyimide film obtained in the Example 22 or 23 was provided with as high adhesive strength as that of a film obtained in the Example 17 or 20.

Examples 26~28

Polyamide acid solution was obtained from 4,4'-diaminodiphenylether and para-phenylenediamine selected from aromatic diamines in the molar ratio of 3:1 and pyromellitic acid dianhydride selected from aromatic tetra-carboxylic dianhydrides. Acetic anhydride and isoquinoline were added to the solution. The molar ratio of the acetic anhydride to a repeating unit of the polyamide acid was 5.8 to 1, and the molar ratio of the isoquinoline to a repeating unit of the polyamide acid was 0.59 to 1. Then the mixture was stirred sufficiently and adjusted to 0° C. to make dope.

The so obtained dope was allowed to flow from a T-die and formed into a film-shaped composition with the thickness of about 250 μm on the smooth metal endless belt consecutively. Then it was dried up by hot air while the belt was rotated. The temperature conditions of the belt chamber was set at 110° C./120° C./125° C. and the total drying time was about 100 seconds.

The prefilms exfoliated from the endless belt were heat-treated in the tenter chamber at the temperature starting from 250° C. up to 500° C., 530° C., or 560° C. (gradually heated up) for about 80 seconds in total. Then the films were gradually cooled down to room temperature in the cooling room. After that, corona discharge treatment was executed against each film and the adhesive strength of the 25 μm-thick polyimide film obtained under the above three temperature conditions was measured. The results of the measurement are shown in Table 6.

TABLE 6

|  | maximum temperature (° C.) | adhesive strength (kg/cm) |
|---|---|---|
| Example 26 | 500 | 1.3 |
| Example 27 | 530 | 1.4 |
| Example 28 | 560 | 1.5 |

These results show that higher maximum temperature produces higher adhesive strength.

In this way, inventors of the present invention pay their attention to the relation between the amount of volatile constituent of a prefilm or the imidation ratio and the adhesive property of a finished film, and the relation between temperature condition of heat-treating of the prefilm and the adhesive property, to which no attention has been given so far.

This invention makes it possible to enhance the adhesive strength of a finished polyimide film by controlling the amount of volatile constituent and the imidation ratio of a prefilm; the temperature and time of heat-treating; and the maximum temperature in a heat-curing process.

Having now fully described the invention, it will be apparent to one of ordinary skills in the art that various changing and modifications can be made thereto without departing from the spirit or scope of the present invention as set forth herein.

What is claimed is:

1. A method for producing an adhesive polyimide film comprising:

casting a composition into a film shape, wherein said composition consists substantially of an organic solvent solution of polyamide acid and chemical curing agents selected from the group consisting of dehydrating agents and tertiary amines;

heating the film shaped composition at an initial temperature of 200° C. or less, and thereafter increasing the temperature in a step-wise fashion such that solvent is evaporated to form a chemically cured prefilm while adjusting an imidation ratio represented by the formula:

$$\frac{\left(\frac{\text{imido group infrared absorbance at 1374 cm}^{-1}}{\text{benzene ring infrared absorbance at 1498 cm}^{-1}}\right)_{\text{prefilm}}}{\left(\frac{\text{imido group infrared absorbance at 1374 cm}^{-1}}{\text{benzene ring infrared absorbance at 1498 cm}^{-1}}\right)_{100\% \text{ imidated film}}}$$

and further heating said prefilm to obtain an adhesive polyimide film.

2. A method for producing an adhesive polyimide film comprising:

casting a composition into a film shape, wherein said composition consists substantially of an organic solvent solution of polyamide acid and one or more chemical curing agents selected from the group consisting of a dehydrating agent and a tertiary amine;

heating the film shaped composition at an initial temperature of 200° C. or less, and thereafter increasing the temperature in a step-wise fashion such that solvent is evaporatiod to form a chemically cured prefilm while adjusting amounts of volatile constituent; and further heating said prefilm to obtain an adhesive polyimide film.

3. A method for producing an adhesive polyimide film comprising:

casting a composition into a film shape, wherein said composition consists substantially of an organic solvent solution of polyamide acid and chemical curing agents selected from the group consisting of dehydrating agents and tertiary amines;

heating the film shaped composition at an initial temperature of 200° C. or less, and thereafter increasing the temperature in a step-wise fashion such that solvent is evaporatiod to form a chemically cured prefilm while adjusting amounts of organic solvent and an imidation ratio represented by the formula:

$$\frac{\left(\frac{\text{imido group infrared absorbance at 1374 cm}^{-1}}{\text{benzene ring infrared absorbance at 1498 cm}^{-1}}\right)_{\text{prefilm}}}{\left(\frac{\text{imido group infrared absorbance at 1374 cm}^{-1}}{\text{benzene ring infrared absorbance at 1498 cm}^{-1}}\right)_{100\% \text{ imidated film}}}$$

and further heating said prefilm to obtain an adhesive polyimide film.

4. A method for producing a polyimide film according to claim 1 or claim 3, wherein said adjusted imidation ratio of the prefilm is 70% or more.

5. A method for producing a polyimide film according to claim 2 or claim 3, wherein said adjusted amount of volatile constituent of the prefilm is 40 weight % or less.

6. A method for producing a polyimide film according to claim 3, wherein said adjusted imidation ratio of the prefilm is 70% or more and said adjusted amount of volatile constituent of the prefilm is 40 weight % or less.

7. A method for producing a polyimide film according to any of claims 1, 2 or 3, wherein the highest temperature of heating a prefilm is in a range from 450° C. to 630° C.

8. A method for controlling adhesiveness of a polyimide film comprising:

casting a composition into a film shape, wherein said composition consists substantially of an organic solvent solution of polyamide acid and chemical curing agents selected from the group consisting of dehydrating agents and tertiary amines;

heating the film shaped composition at an initial temperature of 200° C. or less, and thereafter increasing the temperature in a step-wise fashion such that solvent is evaporatiod to form a chemically cured prefilm while adjusting an imidation ratio represented by the formula:

$$\frac{\left(\dfrac{\text{imido group infrared absorbance at 1374 cm}^{-1}}{\text{benzene ring infrared absorbance at 1498 cm}^{-1}}\right)_{\text{prefilm}}}{\left(\dfrac{\text{imido group infrared absorbance at 1374 cm}^{-1}}{\text{benzene ring infrared absorbance at 1498 cm}^{-1}}\right)_{100\% \text{ imidated film}}}$$

and further heating said prefilm to obtain an adhesive polyimide film.

9. A method for controlling adhesiveness of a polyimide film comprising:

casting a composition into a film shape, wherein said composition consists substantially of an organic solvent solution of polyamide acid and one or more chemical curing agents selected from the group consisting of a dehydrating agent and a tertiary amine;

heating the film shaped composition at an initial temperature of 200° C. or less, and thereafter increasing the temperature in a step-wise fashion such that solvent is evaporatiod to form a chemically cured prefilm while adjusting amounts of volatile constituent; and further heating said prefilm to obtain an adhesive polyimide film.

10. A method for controlling adhesiveness of a polyimide film comprising:

casting a composition into a film shape, wherein said composition consists substantially of an organic solvent solution of polyamide acid and chemical curing agents selected from the group consisting of dehydrating agents and tertiary amines;

heating the film shaped composition at an initial temperature of 200° C. or less, and thereafter increasing the temperature in a step-wise fashion such that solvent is evaporatiod to form a chemically cured prefilm while adjusting amounts of organic solvent and an imidation ratio represented by the formula:

$$\frac{\left(\dfrac{\text{imido group infrared absorbance at 1374 cm}^{-1}}{\text{benzene ring infrared absorbance at 1498 cm}^{-1}}\right)_{\text{prefilm}}}{\left(\dfrac{\text{imido group infrared absorbance at 1374 cm}^{-1}}{\text{benzene ring infrared absorbance at 1498 cm}^{-1}}\right)_{100\% \text{ imidated film}}}$$

and further heating said prefilm to obtain an adhesive polyimide film.

11. The method according to claim 8 or claim 10, wherein the adjusted imidation ratio of the prefilm is 70% or more.

12. The method according to claim 9 or claim 10, wherein the adjusted amount of volatile constituent of the prefilm is 40 weight % or less.

13. The method according to claim 10, wherein the adjusted imidation ratio of the prefilm is 70% or more and the adjusted amount of volatile constituent of the prefilm is 40 weight % or less.

14. The method according to any one of claims 8–10, wherein the highest temperature for heating a prefilm is in a range from 450° C. to 630° C.

* * * * *